United States Patent
Liu et al.

(10) Patent No.: US 10,253,545 B2
(45) Date of Patent: Apr. 9, 2019

(54) BACKUP POWER UNIT FOR POWERED BARRIER OPERATORS

(71) Applicant: ADH GUARDIAN USA, LLC, Santa Fe Springs, CA (US)

(72) Inventors: Heng Liu, New Taipei (TW); Yi Cheng Hsiung, New Taipei (TW); Brian A Strzalka, Glenview, IL (US)

(73) Assignee: ADH Guardian USA, LLC, Santa Fe Springs, CA (US)

( * ) Notice: Subject to any disclaimer, the term of this patent is extended or adjusted under 35 U.S.C. 154(b) by 133 days.

(21) Appl. No.: 15/411,137

(22) Filed: Jan. 20, 2017

(65) Prior Publication Data
US 2018/0209199 A1    Jul. 26, 2018

(51) Int. Cl.
| | | |
|---|---|---|
| *E05F 11/00* | (2006.01) | |
| *E05F 15/60* | (2015.01) | |
| *E05F 15/73* | (2015.01) | |
| *H02J 9/06* | (2006.01) | |
| *H02J 7/00* | (2006.01) | |
| *E05F 15/668* | (2015.01) | |
| *F21V 33/00* | (2006.01) | |
| *F21V 23/04* | (2006.01) | |

(52) U.S. Cl.
CPC .......... *E05F 15/60* (2015.01); *E05F 15/668* (2015.01); *E05F 15/73* (2015.01); *F21V 33/006* (2013.01); *H02J 7/0045* (2013.01); *H02J 7/0047* (2013.01); *H02J 9/061* (2013.01); *E05Y 2400/61* (2013.01); *E05Y 2400/612* (2013.01); *E05Y 2400/614* (2013.01); *E05Y 2800/252* (2013.01); *E05Y 2900/106* (2013.01); *F21V 23/0471* (2013.01); *H02J 2007/005* (2013.01)

(58) Field of Classification Search
CPC ..... E05F 15/79; E05F 15/00; E05F 2015/487; E05F 15/42; E05F 15/665; E05F 15/668; E05F 15/77; E05Y 2900/00; E05Y 2900/106; E05Y 2400/57; E05Y 2400/53
USPC ....... 49/324, 26, 358, 199, 197, 14; 340/5.7, 340/686.1, 545.1, 5.71
See application file for complete search history.

(56) References Cited

U.S. PATENT DOCUMENTS

| | | | |
|---|---|---|---|
| 5,412,297 A * | 5/1995 | Clark | E05F 15/42 318/266 |
| 7,161,319 B2 | 1/2007 | Ergun et al. | |
| 7,207,142 B2 * | 4/2007 | Mullet | E05F 15/668 340/686.1 |

(Continued)

*Primary Examiner* — Chi Q Nguyen
(74) *Attorney, Agent, or Firm* — Pauley Erickson & Kottis

(57) ABSTRACT

A powered barrier operator includes an actuator for moving a movable barrier, such as a garage door, a controller for regulating the operation of the actuator, the controller and actuator being adapted to be energized by a primary power supply. The operator further includes a housing enclosing the actuator and controller, and a secondary power supply assembly, which includes a secondary power supply, such as a rechargeable battery, and a carrier removably attachable to an exterior portion of the housing and adapted to retain the secondary power supply. The controller is operatively connectable to the primary power supply and secondary power supply, and configured to be powered by the secondary power supply when the power from the primary power supply is interrupted and be powered by the primary power supply whether or not the controller is operatively connected to the secondary power supply.

16 Claims, 4 Drawing Sheets

(56) References Cited

U.S. PATENT DOCUMENTS

| | | |
|---|---|---|
| 7,635,966 B2 | 12/2009 | Butler |
| 8,294,553 B2 | 10/2012 | Fitzgibbon |
| 9,122,254 B2 | 9/2015 | Cate et al. |
| 9,141,099 B2 | 9/2015 | Cate et al. |
| 2005/0012631 A1* | 1/2005 | Gregori .................... G07C 3/00 340/686.1 |
| 2006/0132284 A1* | 6/2006 | Murphy ................ G05B 19/042 340/5.7 |
| 2011/0193700 A1* | 8/2011 | Fitzgibbon ............. G05B 15/02 340/541 |
| 2011/0254685 A1* | 10/2011 | Karasek .................. E05F 15/74 340/540 |

\* cited by examiner

BACKUP POWER UNIT FOR POWERED BARRIER OPERATORS

TECHNICAL FIELD

This disclosure relates to power units for powered barrier operators with multiple sources of power, and related methods. Specific arrangements also relate to a powered barrier operator with dual power supply including a primary power supply and a battery backup assembly removably attached to the operator and capable of performing a variety of functions in addition to powering the operator in the absence of a primary power supply.

BACKGROUND

A powered barrier system, such as a garage door and opener system, typically includes a movable barrier and an operator. An operator typically includes an actuator device, such as a motor engaged to the barrier, directly or indirectly, through a linkage mechanism such as gears, couplers (such as in jackshaft operators), a cable or chain, or a combination of them. The operator typically further includes a controller, which controls the movement of the barrier by controlling the operation of the actuator device. For example, the controller may start, stop, and reverse the barrier movement, and may also control the speed of the barrier movement. A powered barrier system may also include various inputs to the controller, and the controller may generate output signals to alter the operation of the actuator device in response to the signals from the inputs. For example, there may be optical sensors positioned to detect any obstacle positioned in the path of barrier movement; the controller, upon receiving signals indicative of the presence of an obstacle in the path, may generate a signal to cause the barrier to stop or move away from the obstacle.

Powered barrier systems, more specifically operators for such systems, can be powered by any suitable power sources. Commonly the primary power source for a powered barrier system is the main electrical power supply for the site where the powered barrier system operates. For example, garage door openers for residential units are commonly powered by the household AC electricity for the residential units. When there is an interruption to the primary power supply, such as when there is a power outage or when the primary power supply is intentionally shut down for services to other parts of the site, the operator becomes non-functional unless there is a secondary power source, such as a backup battery, supplying power to the operator. An operator equipped with a backup battery commonly has the battery enclosed in the operator housing or docked in a docking station integral to, or fixedly attached to, the operator housing. Flexibility in product configuration and utility of the backup battery are limited.

Thus, powered barrier systems with secondary power supplies with improved functionality continue to be developed.

SUMMARY OF THE DISCLOSURE

The present disclosure relates generally to an operator for a powered barrier system, the operator being operable with a primary power supply, such as mains electricity, and a secondary power supply assembly including a secondary power supply, such as a battery and a carrier, such as a holster, adapted to support the secondary power supply. In one aspect of the disclosure, the operator has a housing at least partially enclosing a controller adapted to run an actuator, such as an electrical motor. The carrier is removably attachable to an exterior portion of the housing and electrically connected to the controller through a power interface when removably attached to the exterior portion of the housing, and the operator is operable with the primary power supply, whether the secondary power supply assembly attached to the housing. In one example, the carrier can be removed from the operator housing to make the user interface (switches, etc.) for configuring, or programming, the operator accessible to users. The operator can thus be configured (such as setting power sensitivity and barrier travel limits) while the operator is powered by the primary power supply (e.g., mains power) or secondary power supply (e.g., a charged battery). The secondary power supply can be connected to the operator (either directly or through electrical contacts on the carrier) by an electrical cable and can be disconnected from the operator after the configuration is complete. The operator will function as intended when the primary power supply become available. The ability to program the operator off-grid is beneficial in a number of ways. For example, when there is power outage, the operator (120) can be programmed while powered by the secondary power supply without having to wait until the mains power is restored, thereby saving time. As another example, it can be advantageous to be able to install powered barriers (e.g., garage door openers) and have them programmed at new constructions before the mains power is turned on. A garage door installation contractor can simply use a backup battery to power the operator and program it. The garage door operator is then ready to use when the mains power is turned on.

A further aspect of the present disclosure relates to including auxiliary functionalities in the removable secondary power supply assembly. For example, the secondary power supply assembly (either the carrier or the secondary power supply) in some examples includes a light source, such as one or more LEDs, which can be activated during either normal operation of the operator, when the primary power supply is available to the operator, or during the interruption of the primary power supply. The secondary power supply assembly (the carrier in some examples, but can also be the secondary power supply) can further include one or more sensors, such as motion sensors, which are adapted to generate signals used to control one or more aspects of the operation of the operator, such as activating the light source in the secondary power supply assembly. Other features can include an externally visible visual indicator, such as LED indicator lights, showing the charge level of the secondary power supply.

Another aspect of the present disclosure relates to the modular configuration of the operator. For example, the secondary power supply assembly (secondary power supply or carrier) can include a charging interface adapted to connect the secondary power supply to a power supply (such as mains electricity) that is independent of the power interface between the secondary power supply and the controller. The secondary power supply can thus be charged without the secondary power supply assembly being attached to the operator housing.

DETAILED DESCRIPTION

I. Overview

This disclosure relates to a powered barrier operator with dual power supply including a primary power supply and a modular secondary power supply battery backup assembly, removably attached to the operator, and capable of performing a variety of functions in addition to powering the operator in the absence of a primary power supply.

A powered barrier operator typically includes an actuator linked to a barrier for moving the barrier, and a controller for regulating the operations of the actuator. For example, a garage door opener typically includes an electrical motor (actuator) linked to a moveable garage door (barrier) for driving the barrier between an open position and closed position. The opener also includes a controller connected to the motor and regulating the operation of the motor and, in turn, the movement of the garage door. The operator is powered by at least a primary power supply, such as mains electricity (e.g., 120 or 240 VAC) supplying the site where the powered barrier is located. The operator would cease to be operable in the event of an interruption to the primary power supply. Certain traditional powered barrier operators include a secondary power supply, such as a battery, which keeps the operator operational with at least some basic functionalities, such as opening and closing a garage door.

The secondary power supply in traditional powered barrier operators are typically enclosed in the housing that encloses the actuators and controller, or attached to a docking station fixedly mounted, or integral, to the housing. The utility of the secondary power supply for purposes other than as a back up to the primary power supply is limited.

In one aspect of the present disclosure, a powered barrier operator is operable with a primary power supply and includes a secondary power supply assembly, which includes a secondary power supply and a carrier, that is removably attachable to a housing of the operator and secure the secondary power supply when attached to the housing.

II. Example Configurations

Figure 1:
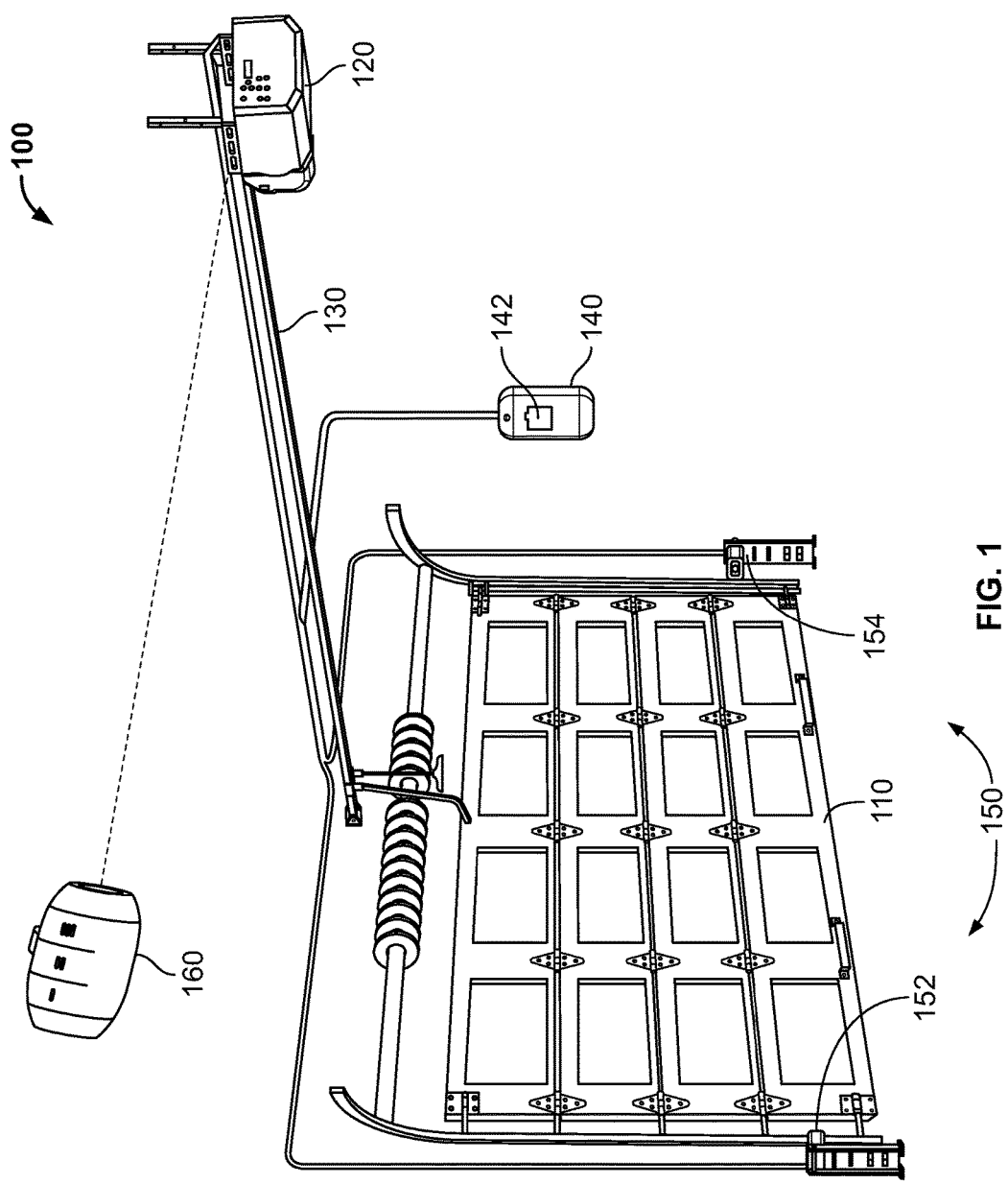
FIG. 1 shows a powered barrier system according to one aspect of the present disclosure.

An example powered barrier system employing an operator according to one aspect of the disclosure is shown in FIG. 1. The system 100 in this example is a garage door system and includes a movable door assembly (110) and an operator (120). As further shown in FIG. 2, the operator (120) includes an electrical motor (212). The motor is engaged to the movable door assembly (110) through a linkage (130), which can be any suitable mechanism, including a belt, cable, chain, gears or a combination of some or all of them. The garage door assembly (110) can thus be moved up and down, or in any other predetermined pattern, to open and close the entrance to the area protected by the barrier.

Figure 2:
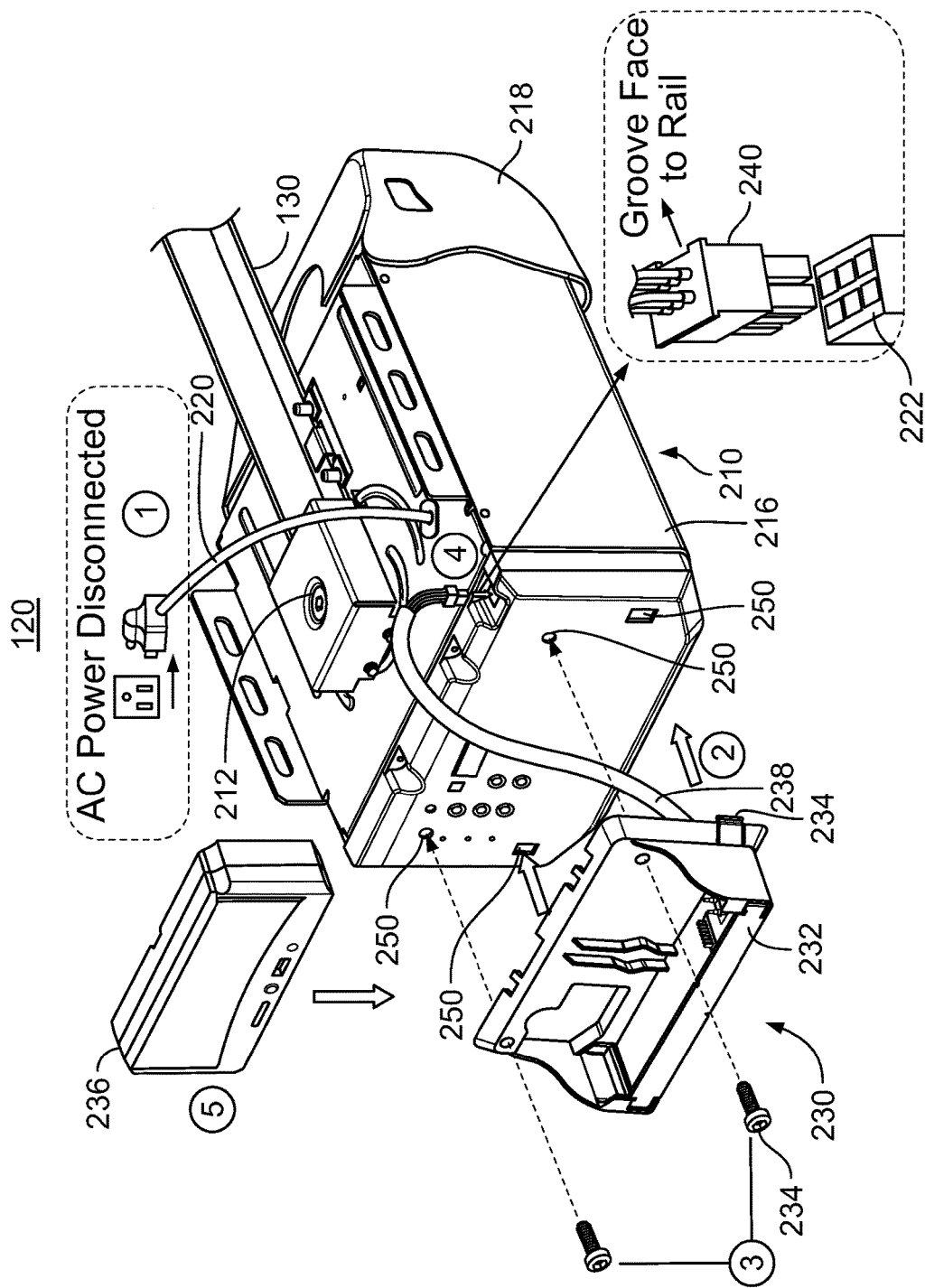
FIG. 2 shows an operator, with a primary and secondary power supplies in a powered barrier system according to an aspect of the present disclosure.

The operator (210) further includes a controller (214) (not shown in FIG. 2, shown in FIG. 4A), which regulates the movement of the motor (212) and, in turn, the movable door assembly (110). The garage door system (100) further includes one or more inputs to the controller (214). For example, a wall-mount user interface (140) in the example in FIG. 1 includes a switch (142), which is connected to the controller (214) and generates signals that cause the controller (210) to change the state of operation of the motor (212), thereby causing the movable door assembly to move in a desired manner (e.g., up, down or stop). The garage door system (100) in this example also includes one or more wireless control units (160) (such as remote controls located in automobiles) which can be operated to send signals wirelessly to the controller (214) to cause a change in the state of operation of the motor (212).

The garage door system (100) can further include other inputs to, and/or outputs from, the controller (214). For example, the garage door system in the example shown in FIG. 1 further includes an obstacle detection system (150), which includes a signal transmitter (152) on one side of the path of the movement of the movable door assembly (110) and a signal receiver (154) on the other side of the path. The transmitter (152) is driven by the controller (214) to transmit signals, which can be of any suitable type, including optical signals, toward the receiver (154). The controller monitors the signals from the receiver (154). When an obstacle is positioned in the path of movement and blocks the transmission of signals from the transmitter (152) to the receiver (154), the controller changes its output to the motor (212) to halt or reverse any motion of the door assembly (110) toward the obstacle.

As shown in FIG. 2, in one example according to the present disclosure, the operator includes two parts that are mechanically and electrically removably attachable to each other. The first part is the main operator unit (210); the second part is the secondary power supply assembly (230). The main operator unit (210) includes a housing (216), which encloses the motor (212) and controller (214). Both the motor and controller can be fully enclosed by the housing, or be enclosed only in part. The housing (216) also includes a mounting mechanism (250) for the secondary power assemble (230) to be attached to the housing (216). Any suitable mechanism can be used, including fasteners such as screws, tabs, threaded or unthreaded holes, snap-fit connectors and hook-and-loop fasteners. The main operator unit (210) in this example also include a main lighting unit (218), which provides illumination of the space in the vicinity of the operator and/or warning signals indicative of certain state of the operation of the system (100), such as when an obstacle is detected in the path of movement of the door assembly (110). The main operator unit (210) further includes a connection to a primary power supply. In this example, an electrical cord (220) provides mains electricity to operator (210).

The secondary power supply assembly (230) in this example includes a carrier (232) and a secondary power supply, which is a rechargeable battery (236). The carrier (232) is removably attachable to the housing (216) of the main operator unit (210) and configured to securely support the battery (236) in the carrier (232). Any suitable mechanism for removably attaching the carrier (232) to the housing (216) can be used. Examples include fasteners (234), such as screws (including thumb screws), nuts, tabs, snap-fit connectors and hook-and-loop fasteners. One advantage a removable carrier provides is flexibility in product configuration—the same operator can be sold with or without a secondary power supply assembly as a backup. The removable secondary power supply assembly can include other optional features, such as emergency or courtesy lighting, to be added to the conventional powered barrier operator. A removable barrier can also serve to maintain a space clearance for easy and proper seating of the secondary power supply (e.g., battery) by blocking out wires and the like around the operator.

The carrier further includes an electrical connector (238) to the main operator unit (210). In the example shown in FIG. 2, the connector is in the form of an electrical cable (238) with a plug (240) which can be plugged into a mating connector (222) in the main operator unit (210). In alternative examples, the connector (238) on the carrier can be a rigid portion, such as a rigid protruding connector portion, of the carrier (232) and engaged to a corresponding connector portion of the main operator unit (210) to establish an electrical connection between the carrier (232) and the main operator unit (210).

Figure 3A:
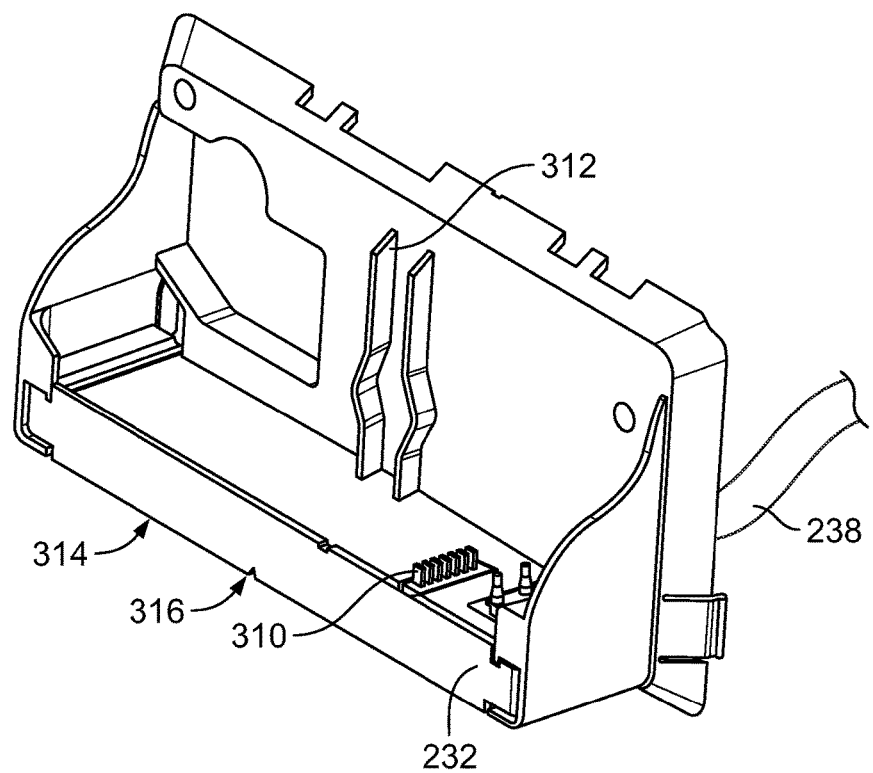
FIG. 3A shows battery as a secondary power supply according to an aspect of the present disclosure. The battery in this example is configured to be held by, and electrically engaged to, the carrier shown in FIG. 3B.
Figure 3B:
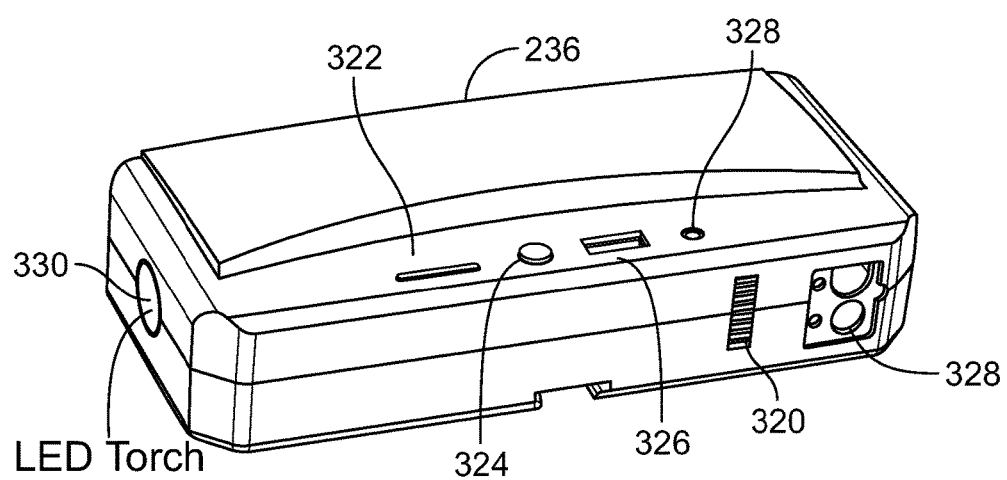
FIG. 3B shows a removable carrier for holding a battery as a secondary power supply according to an aspect of the present disclosure.

As shown in FIG. 3B, the carrier (232) in one example according to the present disclosure further includes a set of electrical contacts (310), in this example arranged in a row in a protruding connector. The contacts (310) are electrically connected to the conductors in the connector (238) and a positioned and adapted to be in electrical contact with a set of electrical contacts in the secondary power supply (236) when it is seated in the carrier, as discussed in more detail below. The carrier (232) thus establishes electrical connection between the secondary power supply (236) and the main operator unit (210). The secondary power supply, when seated in the carrier, can therefore be charged when the primary power supply is operational and can power at least a portion the main operator unit, for example the motor (212) and controller (214). Additional electrical paths between the secondary power supply assembly (230) and the main operator unit (210) can also be included for electrical communication between them.

The carrier (232) in this example also includes one or more retainers, such as ribs (312), positioned and shaped to engage a portion of the secondary power supply (236) to secure it in a seated position in the carrier. The carrier in this example also includes a motion sensor (314) (not explicitly shown), such as an infrared motion sensor, and a secondary lighting unit (316) (not explicitly shown), such as an LED lamp). The motion sensor (314) and secondary lighting unit (316) in this example are operatively connected to the controller (214), which can be configured to turn on the secondary lighting unit (316) under predetermined conditions. For example, the controller can be configured to turn on the secondary lighting unit (316) for a predetermined period of time after an interruption to the primary power supply, or after the motion sensor produces a signal indicative of a detection of movement in a space monitored by the motion sensor (314), whether or not the primary power supply is present. In another example, the secondary lighting unit (316) is powered by the secondary power supply and can be turned on by the controller during normal operation of the operator, i.e., while the primary power supply is adequately functioning.

As shown in FIG. 3A, the secondary power supply, in this example a rechargeable battery (236), includes, in addition to battery cells and a battery management system (BMS) (not explicitly shown), components for a variety of functionalities. The battery (236) in this example includes a set of electrical contacts (320), which, when the battery is properly seated in the carrier (232), are in contact with the electrical contact (310) in the carrier. The battery 236 also includes a battery status indicator (322), which can be a row of LED indicator lights, adapted to show the approximate charge level and other status of the battery (236). The battery (236) further includes a third light source (330), which needs not be operatively connected to the controller (214) and can be used as a flashlight when the battery (236) is taken out of the carrier (232). The battery (236) also includes a switch (324), such as a push-button switch, which, depending on the configuration of the battery management system, can serve a variety of functions, including turning on and off the flashlight (330) and the battery status indicator (322), or cycling through different states of illumination (such as steady and intermittent light, and/or different light colors).

Figure 4A:
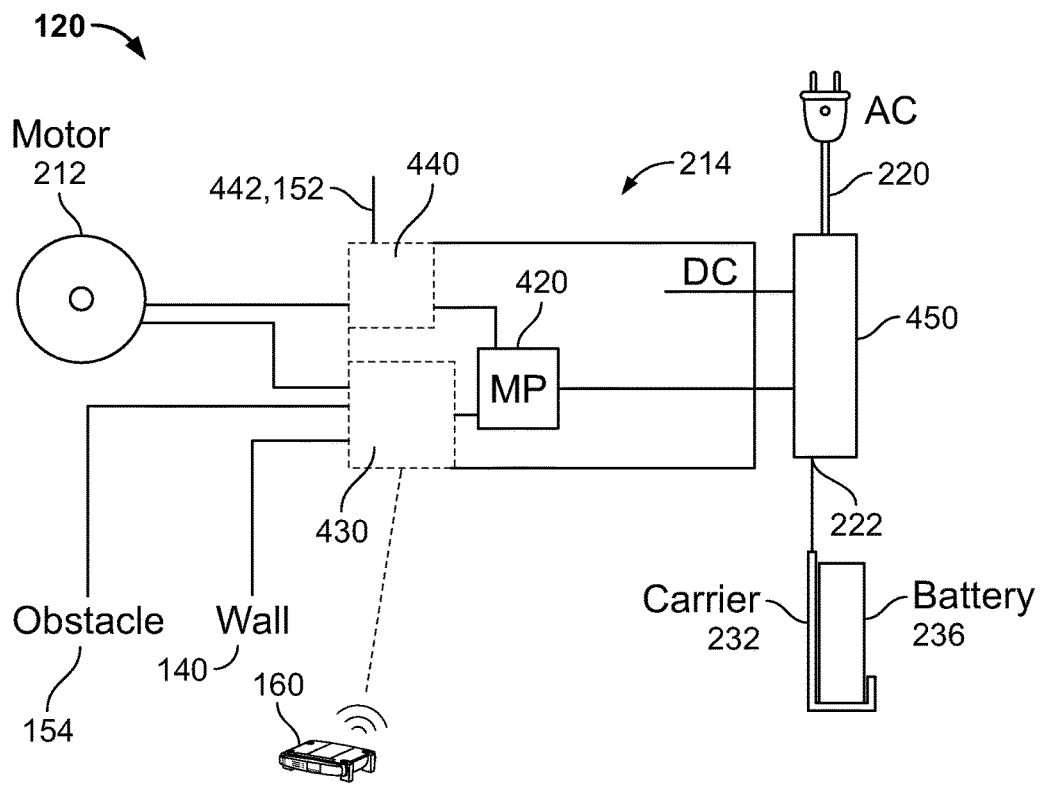
FIG. 4A shows block diagram of the powered barrier operator according to an aspect of the present disclosure.
Figure 4B:
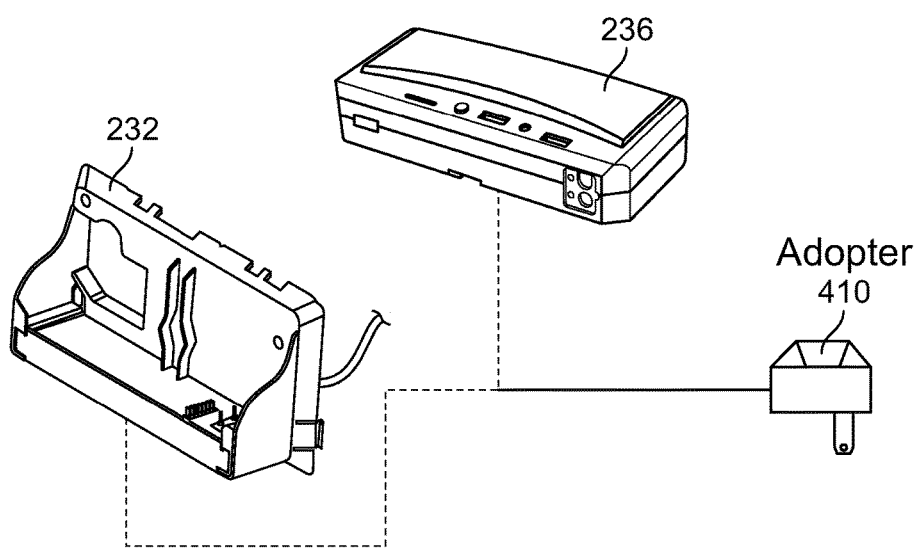
FIG. 4B shows a configuration in which the secondary power supply can be recharged by a power source separate from the interface between the secondary power supply and the controller in the operator according to an aspect of the present disclosure.

The battery (236) further includes an external charger connector (328), which, as shown in FIG. 4B can accept the output of a charging unit (410) so that the battery (236) can be charged even when it is not seated in the carrier (232) or when the secondary power supply assembly (230) is entirely removed from the main operator unit (210). FIG. 4B also shows an alternative configuration, in which the carrier includes an external charger connector (not shown) so that the battery (236) can be charged when the secondary power supply assembly (230) is entirely removed from the main operator unit (210).

The battery (236) can include additional feature for enhanced functionality. For example, it can include one or more power output ports, such as USB sockets or "cigarette lighter" receptacles for powering portable electrical devices (which can be those susceptible to being operated on power outlets available in motor vehicles) when the battery (236) is removed from the operator (120). The battery (236) can also, for example, include a power connector adapted to be engaged to a mating connector of a power cable, which has conductive clips for electrically attaching the cable to a motor vehicle to jump start the motor vehicle using the power of the battery (236).

FIG. 4A shows in more detail a block diagram for a powered barrier operator in one example according to the present disclosure. The operator (120) includes a motor (212) and a controller circuitry (214), which can be analog or digital, in which case a microprocessor or microcontroller (420) can be included. The controller (214) includes one or more inputs (430), which can include inputs for such component as the obstacle sensor (154), wall-mount user interface (140), wireless remote control (160), and other monitoring or motor controls. The controller further includes one or more outputs (440), which can output signals to control such components as the motor (212), obstacle sensor transmitter (152) and the main lighting unit (218).

The controller (214) further includes a power controller 450, which manages to the rest of the controller circuitry. The power controller (450) includes a converter (not explicitly shown), which converts the mains electricity to a DC voltage for use by the control circuitry. The power controller (450) further includes an interface (222) to the secondary power supply assembly, more specifically in this example to the carrier (232). The power controller in one example further includes a backup circuitry, which includes a voltage-controlled switch device, which switches the DC power to the controller (214) from the converter to the secondary power supply (e.g., battery) the voltage at the primary power supple falls below a certain level consistent with an interruption to the primary power supply.

The controller (214) is configured to keep the operator operative on both the primary and secondary power supply. In particular, in one aspect of this disclosure, the programming, or set-up, functionality of controller (214) remains available to the user, so that the operation parameters (e.g., garage door travel distance, travel limits, etc.) of the powered barrier system can be configured even when the primary power supply is not available. For example, the carrier (232) can be removed from the operator housing to make the user interface (switches, etc.) for configuring, or programming, the operator accessible to users. The operator (120) can thus be configured (such as setting power sensitivity and barrier travel limits) while the operator (120) is powered by the primary power supply (e.g., mains power) or secondary power supply (e.g., a charged battery), which can by connected to the operator by an electrical cable. The secondary power supply can be disconnected from the operator after the configuration is complete, and the operator will function as intended when the primary power supply become available.

III. Summary

Thus, according to the present disclosure, a powered barrier operator with a removable backup power supply assembly is achieved, which, among other things, enhances flexibility in product configuration and reduces the size of operator housing. The additional features in the secondary power supply assembly enhance the utility of the powered barrier operator and improve the safety and comfort of the site in the vicinity of the operator.

The above specification, examples and data provide a complete description of the machine and use of the invention. Since many embodiments of the invention can be made without departing from the spirit and scope of the invention, the invention resides in the claims hereinafter appended.

We claim:

1. A powered barrier operator, comprising:
an actuator operatively linked to, and adapted to move, a movable barrier;
a controller operatively connected to the actuator and adapted to regulate the operation of the actuator, the controller and actuator being adapted to be energized by a primary power supply;
a housing enclosing the actuator and controller; and
a secondary power supply assembly, comprising:
secondary power supply; and
a carrier comprising a support removably attachable to an exterior portion of the housing and adapted to retain the secondary power supply, and a plurality of electrical conductors disposed and adapted to electrically connect the secondary power supply to the controller whereby the carrier is attached to the housing and the secondary power supply is retained in the carrier;
the controller being operatively connectable to the primary power supply and secondary power supply, and configured to be powered by the secondary power supply wherein power from the primary power supply is interrupted and be powered by the primary power supply whether or not the controller is operatively connected to the secondary power supply.

2. The powered barrier operator of claim 1, wherein the controller and actuator are adapted to be energized by mains electricity, and the secondary power supply comprises a rechargeable battery.

3. The powered barrier operator of claim 2, wherein the secondary power supply is configured to both be charged wherein the secondary power supply is retained in the carrier, and the retainer is attached to the housing, and by another charger when the secondary power supply assembly is removed from the housing.

4. The powered barrier operator of claim 2, wherein the secondary power supply comprises an integrated flashlight energized by the secondary power supply.

5. The powered barrier operator of claim 2, wherein the rechargeable battery includes an indicator visible external to the operator and adapted to signal a charge level of the rechargeable battery.

6. The powered barrier operator of claim 1, the carrier further comprising a lighting source.

7. The powered barrier operator of claim 6, wherein the lighting source is energized by the secondary power supply wherein the controller and actuator are energized by the primary power source.

8. The powered barrier operator of claim 6, further comprising a sensor adapted to detect motion or presence of a person within a monitored area, wherein the controller is configured to turn on the lighting source whereby the sensor generates a signal indicative of motion or presence of a person within the monitored area.

9. The powered barrier operator of claim 6, wherein the lighting source is connected to be powered exclusively by the secondary power supply.

10. The powered barrier operator of claim 1, wherein the controller is adapted to permit a user to configure the controller to set one or more constraints on operation of the actuator while the operator is powered by the secondary power supply.

11. The powered barrier operator of claim 10, further comprising a user interface supported on the housing or accessible through the housing, and a cable adapted to electrically connect the secondary power supply assembly to the controller, thereby enabling a user to access the user interface to set the one or more constraints on the operation of the actuator wherein the secondary power supply assembly is removed from the operator housing.

12. A kit, comprising:
a powered barrier operator of claim 2; and
a charger separate from the powered barrier operator, the charger being connectable to, and adapted to charge the battery when the battery is not electrically connected to the operator.

13. The kit of claim 12, wherein the batter further comprise two connectors for receive electrical power to charge the battery, wherein the two connectors are differently shaped from each other, wherein one of the connectors is disposed and adapted to be electrically connected to the electrical conductors, and the other connector is disposed and adapted to be electrically connected to the charger separate from the powered barrier operator.

14. A powered barrier operator, comprising:
an actuator operatively linked to, and adapted to move, a movable barrier;
a controller operatively connected to the actuator and adapted to regulate the operation of the actuator, the controller and actuator being adapted to be energized by mains electricity;
a housing enclosing the actuator and controller; and a secondary power supply assembly, comprising:
  a rechargeable battery;
  a carrier comprising a support and adapted to retain the rechargeable battery, and a plurality of electrical conductors disposed and adapted to electrically connect the rechargeable battery to the controller wherein the carrier is attached to the housing and the rechargeable battery is retained in the carrier;
the controller being operatively connectable to the mains electricity and rechargeable battery, and configured to be powered by the rechargeable battery wherein the mains electricity is interrupted and be powered by the mains electricity whether or not the controller is operatively connected to the rechargeable battery; and
a power controller comprising a converter, configured to transform mains electricity to a DC voltage, and an interface to the rechargeable battery through the plurality of electrical conductors in the carrier in the secondary power supply assembly, the power controller further comprising a backup controller comprising a sensor adapted to detect interruptions to the mains electricity, the backup controller being adapted to connect the DC voltage to the controller in the absence of interruption to the mains electricity, and to connect the rechargeable battery to the controller when the sensor detects an interruption to the mains electricity.

15. A powered barrier operator, comprising:
an actuator operatively linked to, and adapted to move, a movable barrier,
a controller operatively connected to the actuator and adapted to regulate the operation of the actuator, the controller and actuator being adapted to be energized by a primary power supply;
a housing enclosing the actuator and controller, and comprising a connection mechanism adapted to permit a secondary power supply to be removably attached to the housing; and
an interface adapted to electrically connect the secondary power supply assembly to the controller with a set of electrical contacts, wherein the secondary power supply is removably attached to the housing.

16. The powered barrier operator of claim 15, wherein the controller and actuator are adapted to be energized by mains electricity, and the secondary power supply comprises a rechargeable battery, the operator further comprising a power controller: wherein the power controller comprises a converter, configured to transform mains electricity to a DC voltage, and an interface electrically connected to the secondary power supply assembly, the power controller further comprising a backup controller comprising a sensor adapted to detect interruptions to the mains electricity, the backup controller being adapted to connect the DC voltage to the controller in the absence of interruption to the mains electricity, and to connect the rechargeable battery to the controller whereby the sensor detects an interruption to the mains electricity.

* * * * *